Jan. 11, 1955
J. A. DUKE
2,699,281
MACHINE FOR FILLING AND CAPPING ICE-CREAM CUPS
Filed Jan. 19, 1953
6 Sheets-Sheet 1
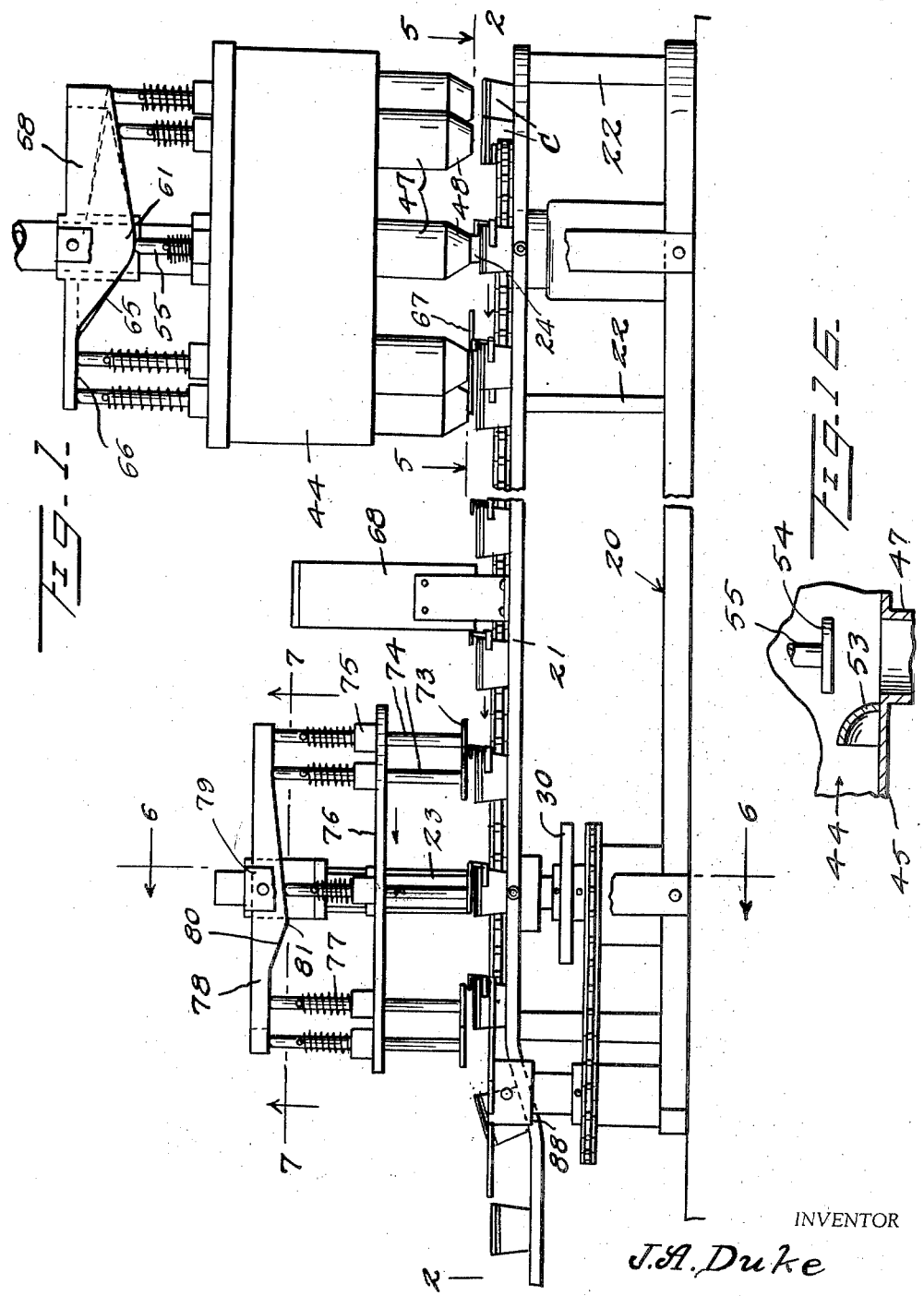
INVENTOR
J. A. Duke
BY
Kimmel & Crowell
ATTORNEYS Jan. 11, 1955   J. A. DUKE   2,699,281
MACHINE FOR FILLING AND CAPPING ICE-CREAM CUPS
Filed Jan. 19, 1953   6 Sheets-Sheet 2
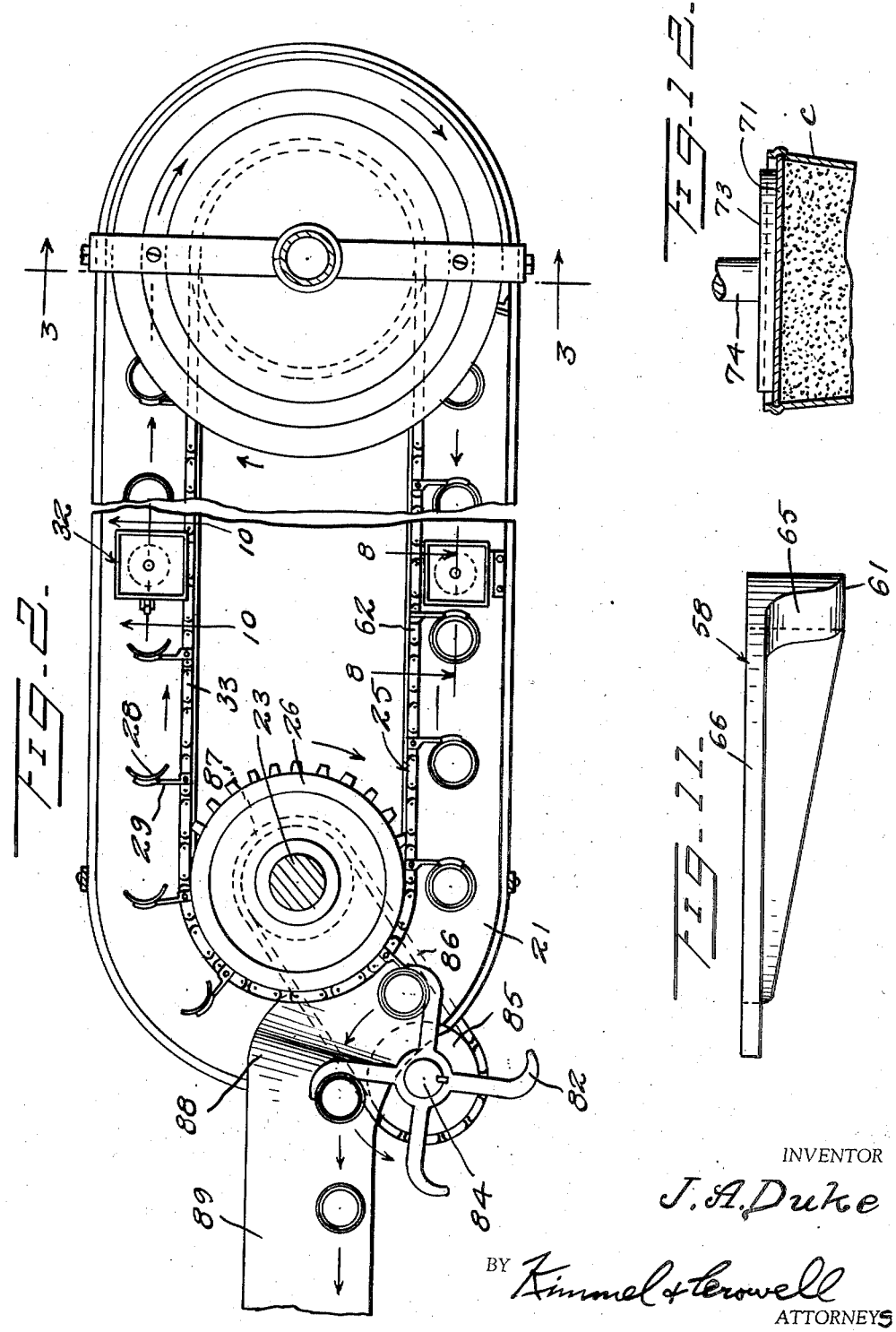
INVENTOR
J. A. Duke
BY Kimmel & Crowell
ATTORNEYS Jan. 11, 1955  J. A. DUKE  2,699,281
MACHINE FOR FILLING AND CAPPING ICE-CREAM CUPS
Filed Jan. 19, 1953  6 Sheets-Sheet 3
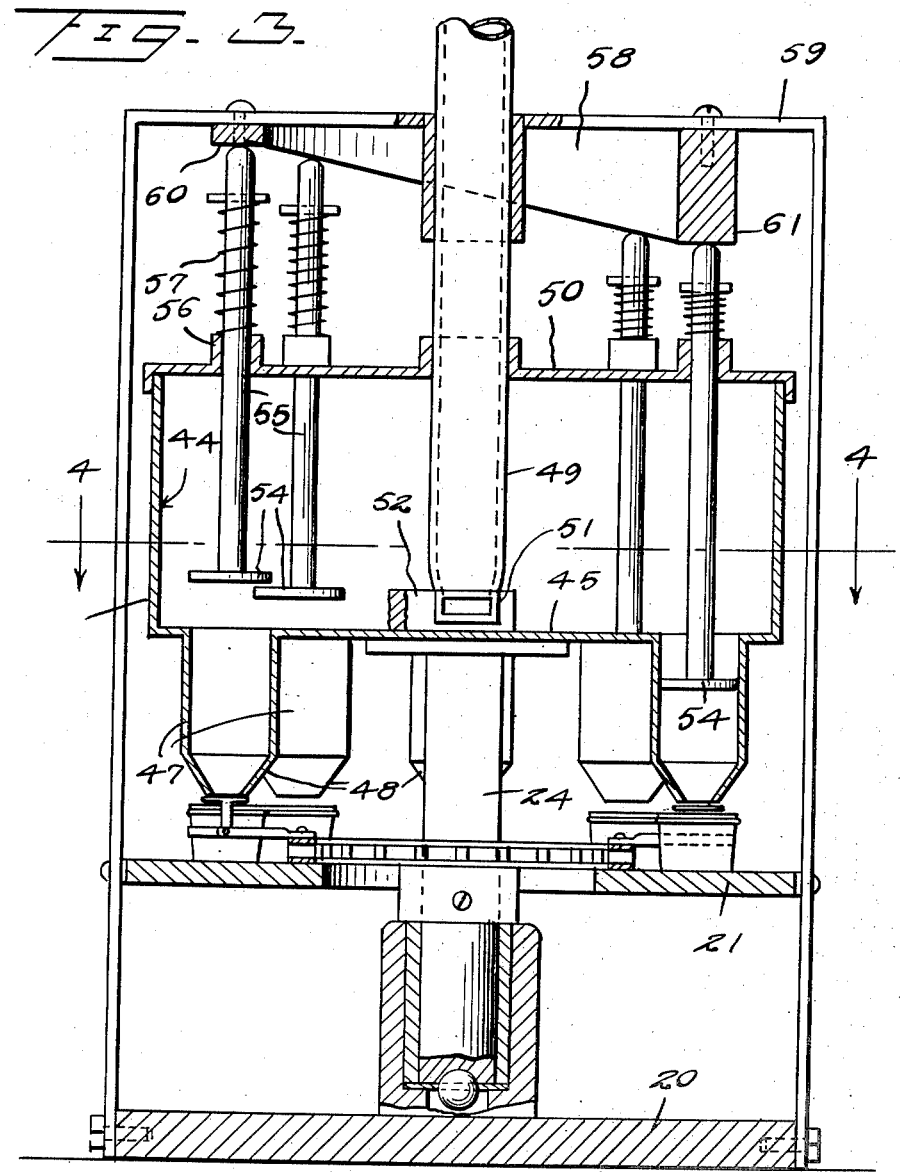
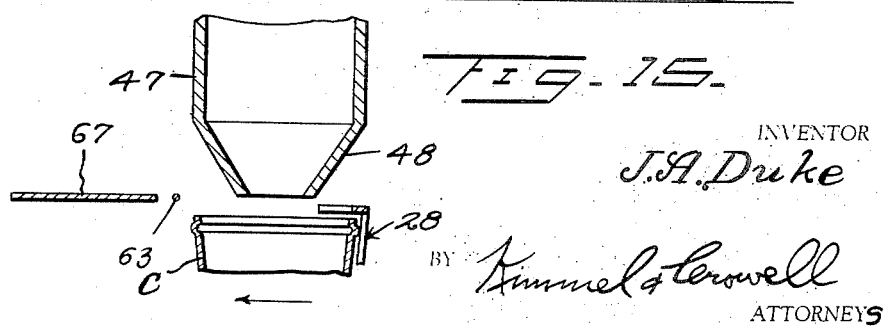
INVENTOR
J.A. Duke
BY
ATTORNEYS Jan. 11, 1955   J. A. DUKE   2,699,281
MACHINE FOR FILLING AND CAPPING ICE-CREAM CUPS
Filed Jan. 19, 1953   6 Sheets-Sheet 4
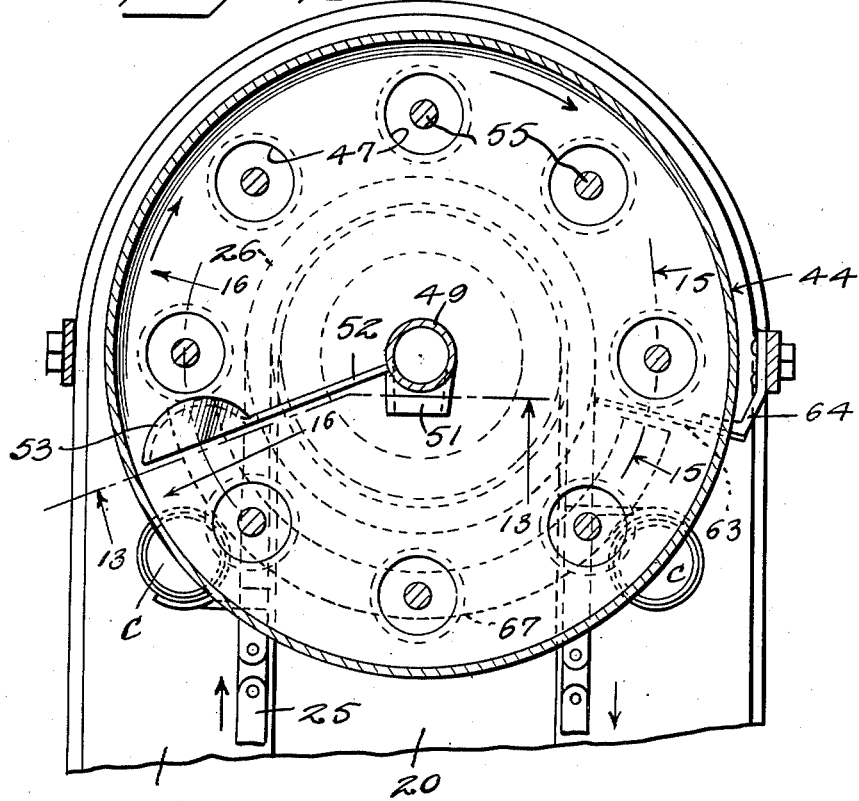
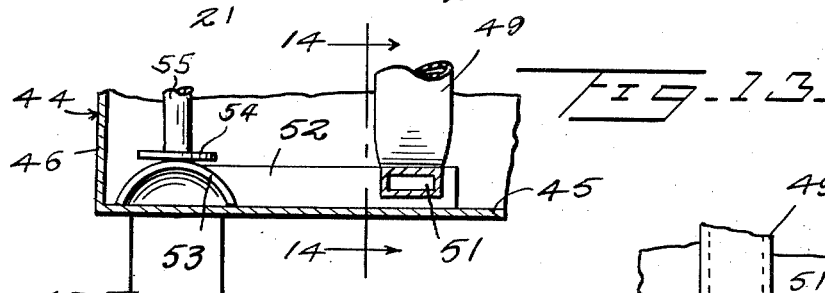
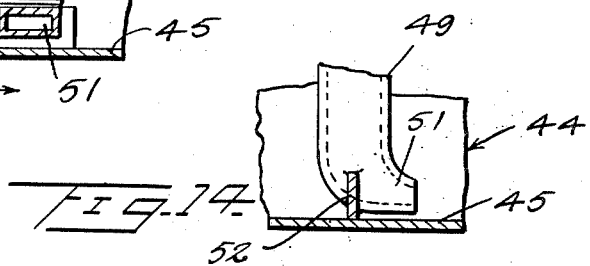
INVENTOR
J. A. Duke
BY Kimmel & Crowell
ATTORNEYS Jan. 11, 1955   J. A. DUKE   2,699,281
MACHINE FOR FILLING AND CAPPING ICE-CREAM CUPS
Filed Jan. 19, 1953   6 Sheets-Sheet 5
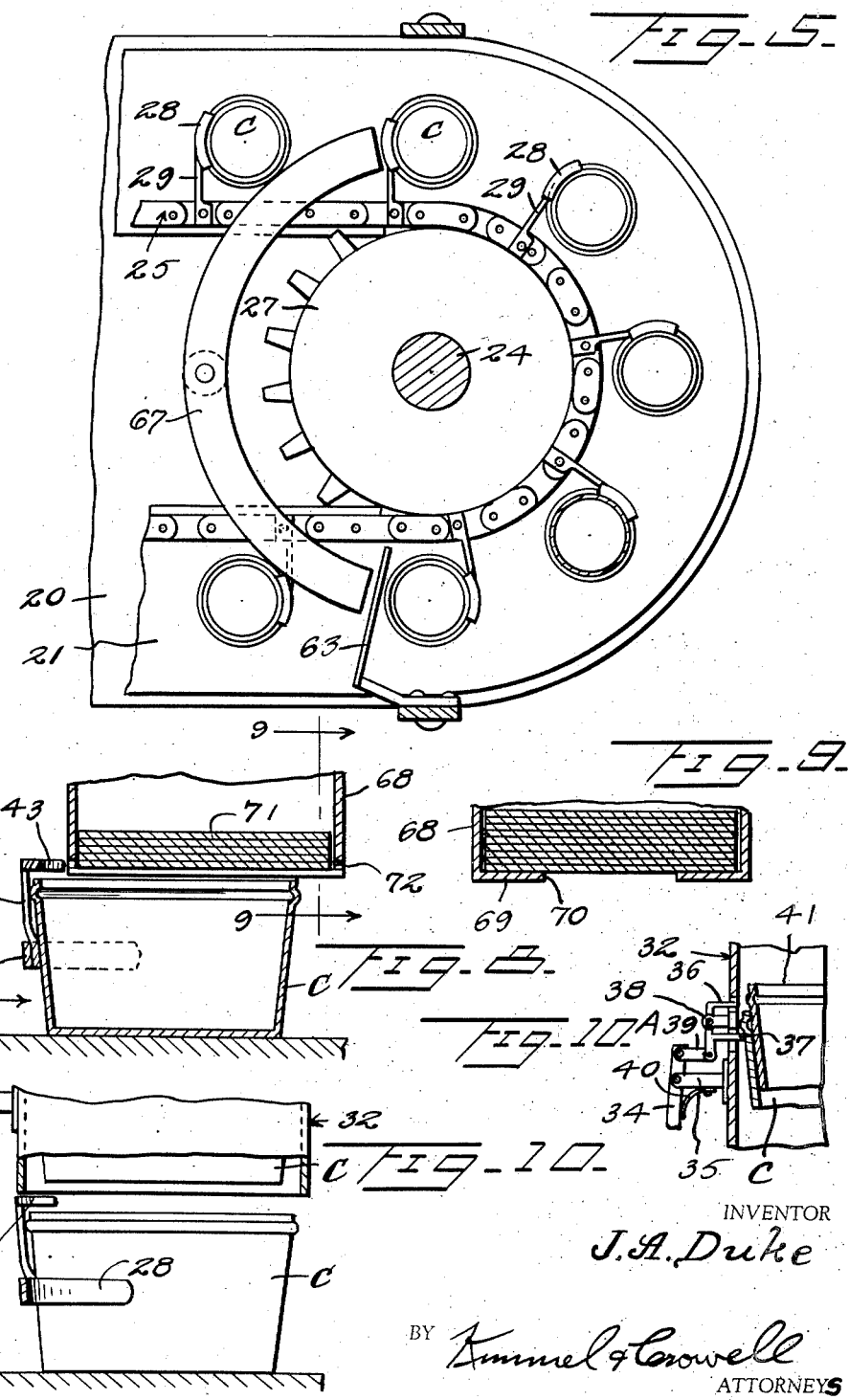

Jan. 11, 1955 J. A. DUKE 2,699,281
MACHINE FOR FILLING AND CAPPING ICE-CREAM CUPS
Filed Jan. 19, 1953 6 Sheets-Sheet 6
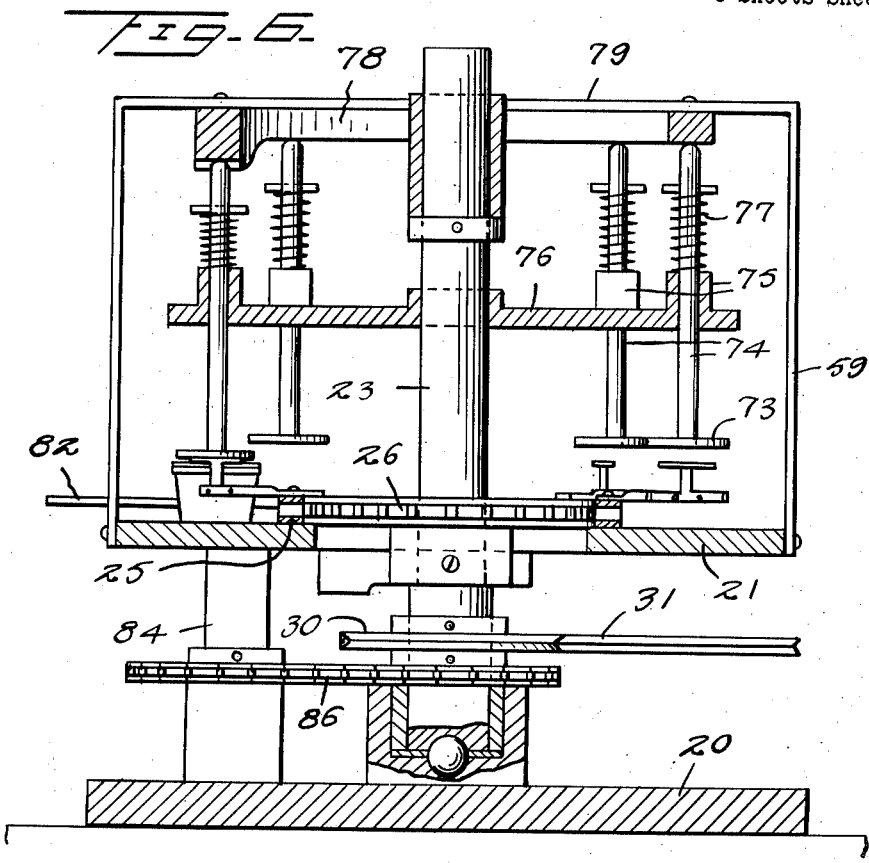
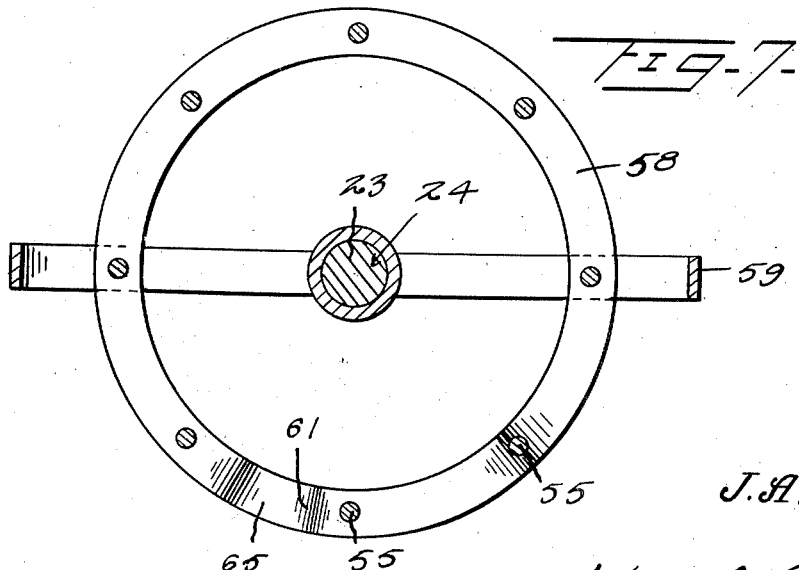
INVENTOR
J. A. Duke
BY Kimmel & Crowell
ATTORNEYS

United States Patent Office 2,699,281
Patented Jan. 11, 1955

2,699,281

MACHINE FOR FILLING AND CAPPING ICE-CREAM CUPS

James A. Duke, Atlanta, Ga.

Application January 19, 1953, Serial No. 331,816

6 Claims. (Cl. 226—76)

This invention relates to a machine for filling and capping ice cream cups.

An object of this invention is to provide a machine whereby cups made of cardboard or other material may be filled with ice cream and the filled cups then capped in a rapid and continuous operation.

Another object of this invention is to provide a filling and capping machine for ice cream cups which is simple in construction and can be readily maintained in a sanitary condition.

A further object of this invention is to provide an improved cap dispensing and applying means whereby caps may be applied to the filled cups as the cups are being moved by a conveyor or carrier.

A further object of this invention is to provide an improved means for removing the filled and capped cups from the conveyor or carrier.

A further object of this invention is to provide a machine which can be used for filling cups with ice cream, cottage cheese or other coagulated or partly coagulated and partly solid material.

With the above and other objects in view, my invention consists in the arrangement, combination and details of construction disclosed in the drawings and specification, and then more particularly pointed out in the appended claims.

In the drawings,

Figure 1 is a detailed side elevation of a machine for filling and capping ice cream cups constructed according to an embodiment of this invention, Figure 2 is a sectional view taken on the line 2—2 of Figure 1, Figure 3 is a sectional view taken on the line 3—3 of Figure 2, Figure 4 is a fragmentary sectional view taken on the line 4—4 of Figure 3, Figure 5 is a fragmentary sectional view taken on the line 5—5 of Figure 1, Figure 6 is a sectional view taken on the line 6—6 of Figure 1, Figure 7 is a fragmentary sectional view taken on the line 7—7 of Figure 1, Figure 8 is a fragmentary sectional view taken on the line 8—8 of Figure 2, Figure 9 is a fragmentary sectional view taken on the line 9—9 of Figure 8, Figure 10 is a fragmentary sectional view taken on the line 10—10 of Figure 2, Figure 10A is a fragmentary sectional view showing the receptacle or cup feeding means, Figure 11 is a detailed side elevation of the cam operating the cup filler plungers, Figure 12 is a fragmentary sectional view showing one of the capping plungers in operative position, Figure 13 is a fragmentary sectional view taken on the line 13—13 of Figure 4, Figure 14 is a fragmentary sectional view taken on the line 14—14 of Figure 13, Figure 15 is a fragmentary sectional view taken on the line 15—15 of Figure 4, Figure 16 is a fragmentary sectional view taken on the line 16—16 of Figure 4.

Referring to the drawings, the numeral 20 designates generally a base structure and the numeral 21 designates generally a horizontal table disposed above the base 20 and supported by means of supporting members 22. A pair of vertically disposed shafts 23 and 24 are rotatably carried by the base 20 and project upwardly through the table 21.

An endless conveyor chain 25 engages about sprockets 26 and 27 which are fixed to the shafts 23 and 24 respectively. The conveyor chain 25 movably engages over the table 21 and a plurality of longitudinally curved cup carriers 28 are fixed to the chain 25 and supported laterally therefrom by means of carrier supporting bars 29. Shaft 23 has fixed thereto a driving wheel 30 about which a belt or other flexible driving element 31 is disposed and belt 31 is adapted to be engaged with a power means (not shown).

A paper cup dispenser generally indicated at 32 is supported in any suitable manner above the table 21 between the shafts 23 and 24 and over the path of movement of the carriers 28. The cups C are adapted to be dispensed in sequence onto the table 21 for engagement by the carriers 28 as the latter move to the right along the run 33 of the conveyor 25.

One form of cup dispensing means is shown in Figures 10 and 10A, and embodies a pivoted lever 34 which is rockably carried by a bracket 35 fixed to the dispenser 32. A pair of inwardly projecting cup engaging arms 36 and 37 are rockably supported as at 38 and are connected to the tripping lever 34 by means of a pivoted link 39. A spring 40 constantly urges the tripping lever 34 to cup holding position wherein member 37 is projected inwardly for engagement with the bead 41 of the lowermost cup C.

Each arm 29 has fixed thereto an upwardly extending arm 42 on which is secured an arcuate member 43. Arcuate member 43 not only performs the function of releasing a lower cup C by engaging the tripping lever 34, but also performs the function of discharging a lower cap from a cap magazine as will be hereinafter described. The released cup C is adapted to drop downwardly onto the table in front of the carrier 28 and the cup is then moved forwardly from the cup dispenser 32 to the filling zone.

The filling zone comprises a hopper 44 having a bottom wall 45 and a cylindrical side wall 46. The hopper 44 is fixed to the upper end of shaft 24 and is rotatable therein. A plurality of depending and circumferentially spaced apart cylinders 47 project downwardly from the bottom wall 45 of the hopper 44 and the lower ends of the cylinder 47 terminate in tapered nozzles 48. The cylinders 47 and the nozzles 48 are adapted to overlie the cups C as the latter move about one end of the conveyor 25. The partially frozen ice cream or other partly liquid material is discharged into the hopper 44 through a vertically disposed feed pipe 49 which extends through the cap or top wall 50 mounted on the hopper 44. The feed pipe 49 terminates at its lower end in a horizontally projecting discharge nozzle 51 for discharging the material such as ice cream or the like directly onto the bottom of the hopper 44.

A radially disposed bar or scraper 52 extends from the nozzle 51 and the outer end of the scraper 52 has secured thereto a cup-shaped scoop 53 which is disposed in a position to engage over the upper open ends of the cylinders 47 so that the ice cream will be scooped into the cylinders 47 as the hopper 44 rotates.

In order to provide a means whereby the material in the cylinders 47 may be forced downwardly for discharge from the nozzles 48 into the cups at the filling end or zone of the machine, I have provided a plurality of plungers 54 which are carried by vertically disposed plunger rods 55. The plunger rods 55 are slidable through guides 56 carried by the cap or top wall 50 and are constantly urged upwardly by means of springs 57. A stationary circular cam 58 is fixedly secured to an inverted U-shaped support 59 carried by the base 20 and the cam 58 has a low point 60 at the end of the run 33 and a high point 61 at the beginning of the second straight or parallel run 62 of chain conveyor 25. When the filled cups reach the high point 61 of the cam 58, the material which is being discharged from the nozzles 48 is cut off by means of a stationary inwardly projecting cutter wire 63 carried by a supporting bracket arm 64. At the time the material is cut through between the lower end of each nozzle 48 and the upper edge of a cup C, the plunger rods 55 begin to rise upwardly on the trailing upwardly inclined surface 65 of the cam 58. The upward movement of the plunger rod 55 is relatively rapid and the upper end of the incline 65 terminates in a horizontal dwell portion 66 of the cam 58.

A horizontally disposed and substantially semi-circular material retaining plate 67 is supported above the table 21 in a position closely adjacent the lower ends of the nozzles 48 so that the material in the cylinder 47 will be held against draining or downward movement until the cylinders again overlie an empty cup at the end of the run 33. The filled cups passing beyond the cutter 63 move beneath a cap magazine 68 which is formed, as shown in Figures 8 and 9, with a bottom wall 69 having a slot 70. The slot 70 is of a width whereby the arcuate member 43 may freely move therethrough and arcuate member 43 which at this time operates as a cap discharging member, is adapted to engage the lower one of superposed caps 71 which are in the magazine 68. The lower cap is then pushed outwardly through an opening 72 formed in the magazine 68 and the released cap 71 then drops into the upper flared end of the cup C. The cup having the cap loosely mounted thereon then moves forwardly or to the left along run 62 and then engages beneath a capping plunger 73 carried by a vertically slidable plunger rod 74. The rod 74 is slidable through guide means 75 carried by a disc 76 which is fixed to shaft 23. The plunger rods 74 are constantly urged upwardly by means of springs 77 and the ends of rods 74 slidably engage the lower surface of a plunger operating cam 78. The cam 78 is fixedly secured relative to the base 20, being secured to an inverted U-shaped support 79.

Cam 78 is formed with a relatively sharply inclined trailing surface 80 which extends from the high point 81 so that the plunger rods 74 and the plunger 73 will be rapidly withdrawn from the cups after the cap has been pressed into the groove formed by the bead 41. At the trailing end of the run 62 and the left end of the table 21, the now filled and capped cups are disengaged from the carriers 28 by means of cup disengaging arms 82 carried by radial arms 83 which are fixed to a vertical shaft 84. The shaft 84 has fixed thereto a sprocket 85, and a chain 86 engages about sprocket 85 and about a sprocket 87 which is fixed to shaft 23.

The table 21 at the discharge end thereof is formed with a downwardly inclined cup guiding means 88 terminating in a horizontal platform or table extension 89.

In the use and operation of this machine, the dispenser 32 is filled with empty cups and dispenser 68 is filled with caps 71 which are disc-shaped. Conveyor 25 is operated from the driving belt or member 31 and as each carrier 28 trips the lever 34, an empty cup C will be discharged onto the table 21. The partially liquid ice cream or other material is discharged through the nozzle 51 into the hopper 44 and as an empty cup comes into registry with a delivery nozzle 48, a plunger rod 55 will begin to move downwardly by engaging the downwardly inclined surface of cam 58. While hopper 44 is rotating, the ice cream discharged from nozzle 51 will move radially and outwardly from nozzle 51, being moved outwardly by scraper 52, and as each cylinder 47 comes beneath the scoop 53 the material is forced downwardly into the cylinder 47. The filling of each cylinder 47 is just ahead of the point of registry of an empty cup with a delivery nozzle 48.

As will be noted from Figure 3, the plungers 54 are initially disposed above the scoop 53 and above the upper ends of the cylinders 47 so that in the initial downward movement of the plungers 54 these plungers will be moved toward the cylinders 47. As soon as the plungers 54 enter the cylinders 47, the material in the cylinders will be forced downwardly and discharged from the nozzles 48 into the receptacles or cups C. After passing the cutter member 63 the now filled but uncapped cups move forwardly at the beginning of run 62 and pass beneath the cap dispenser 68. Cap delivery member 43 will deliver a cap from dispenser or magazine 68 into the open upper end of cup C and with the cap loosely disposed in the cup C, the cup is moved forwardly in a continuous movement into the capping zone or station wherein capping plunger 73 is moved downwardly by cam 78 into a registering cup C. The now completely capped and filled cups are disengaged from the carriers 28 by the cup removing or disengaging members 82 which are of hook-shape and are rotated by means of the shaft 84. The disengaged cups are moved outwardly and downwardly over the inclined guide 88 onto the horizontal table extension or platform 89.

It will be understood that there may be as many cylinders 47 as may be desired and there will be as many capping plungers 73 as there are cylinders 47.

This machine may be used for filling paper cups with ice cream, cottage cheese, or other material which is in a plastic or partly liquid state. The downward movement of each plunger 54 is determined by the cam 58 and it will be understood that the length of movement of each plunger 54 may be varied by changing the cam 58 so that cups of different sizes may be filled with the same machine.

I do not mean to confine myself to the exact details of construction herein disclosed, but claim all variations falling within the purview of the appended claims.

What I claim is:

1. A machine for filling receptacles with partly liquid material comprising a base, a horizontal table above said base, an endless conveyor above said table, means movably supporting said conveyor, a plurality of spaced receptacle carriers carried by said conveyor, means at one run of said conveyor delivering empty receptacles to said carriers, means at one end of said conveyor delivering a predetermined quantity of material to said receptacles, means at the other run of said conveyor delivering a cap to the receptacle, means at the other end of said conveyor pressing the cap into the receptacle, and means at said other end of said conveyor removing the receptables from the carriers.

2. A machine for filling receptacles with partly liquid material, comprising a base, a horizontal table above said base, a pair of vertical shafts rotatably carried by said base one adjacent each end of said table, a sprocket fixed to each shaft above said table, a chain conveyor trained about said sprockets, a plurality of laterally projecting bracket arms fixed to said conveyor, arcuate receptacle carriers fixed to said arms, means overlying one run of said conveyor for delivering empty receptacles to said carriers, means at one end of said conveyor operable by movement of the latter for discharging a predetermined quantity of material into said receptacles, means overlying the other run of said conveyor discharging a cap into said receptacles, and means at the other end of said conveyor for pressing said caps into said receptacles.

3. A machine for filling receptacles with partly liquid material, comprising a base, a horizontal table above said base, a pair of vertical shafts rotatably carried by said base one adjacent each end of said table, a sprocket fixed to each shaft above said table, a chain conveyor trained about said sprockets, a plurality of laterally projecting bracket arms fixed to said conveyor, arcuate receptacle carriers fixed to said arms, means overlying one run of said conveyor for delivering empty receptacles to said carriers, means at one end of said conveyor operable by movement of the latter for discharging a predetermined quantity of material into said receptacles, means overlying the other run of said conveyor discharging a cap into said receptacles, means at the other end of said conveyor for pressing said caps into said receptacles, and means at said other end of said conveyor for removing said receptacles from said carriers.

4. A machine for filling receptacles with partly liquid material, comprising a base, a horizontal table disposed above said base, a pair of vertical shafts rotatably carried by said base, a sprocket fixed to each shaft above said table, a conveyor chain engaging about said sprockets, laterally projecting receptacle carriers fixed to said chain adapted to move the receptacles about said table, means above one run of said chain for delivering a receptacle to a carrier, a plurality of circumferentially arranged cylinders fixed relative to one of said shafts and arranged to vertically align with said receptacles at one end of said conveyor, a plunger for each cylinder, means slidably supporting said plungers, means normally urging said plungers outwardly and above the upper ends of said cylinders, means discharging the material into said cylinders, stationary cam means disposed above said plunger for moving the latter downwardly to thereby discharge a predetermined quantity of material into said receptacles, a cap holder disposed above the other run of said conveyor, a cap ejector carried by each carrier for removing a cap from said holder for discharge of the cap into a receptacle, and means at the other end of said conveyor for pressing a cap into a receptacle.

5. A machine for filling receptacles with partly liquid material, comprising a base, a horizontal table disposed above said base, a pair of vertical shafts rotatably carried by said base, a sprocket fixed to each shaft above said table, a conveyor chain engaging about said sprockets, laterally projecting receptacle carriers fixed to said chain adapted to move the receptacles about said table, means above one run of said chain for delivering a receptacle to a carrier, a plurality of circumferentially arranged cylinders fixed relative to one of said shafts and arranged to vertically align with said receptacles at one end of said conveyor, a plunger for each cylinder, means slidably supporting said plungers, means normally urging said plungers outwardly and above the upper ends of said cylinders, means discharging the material into said cylinders, stationary cam means disposed above said plungers for moving the latter downwardly to thereby discharge a predetermined quantity of material into said receptacles, a cap holder disposed above the other run of said conveyor, a cap ejector carried by each carrier for removing a cap from said holder for discharge of the cap into a receptacle, a second series of circumferentially arranged plungers, means supporting said second plungers relative to the other one of said shafts, spring means constantly urging said second plungers upwardly to inoperative position, and a second stationary cam engaging the upper ends of said second plungers and operative to move the latter downwardly to cap pressing position when said receptacles and caps are disposed therebeneath.

6. A machine for filling receptacles with partly liquid material, comprising a base, a horizontal table disposed above said base, a pair of vertical shafts rotatably carried by said base, a sprocket fixed to each shaft above said table, a conveyor chain engaging about said sprockets, laterally projecting receptacle carriers fixed to said chain adapted to move the receptacles about said table, means above one run of said chain for delivering a receptacle to a carrier, a plurality of circumferentially arranged cylinders fixed relative to one of said shafts and arranged to vertically align with said receptacles at one end of said conveyor, a plunger for each cylinder, means slidably supporting said plungers, means normally urging said plungers outwardly and above the upper ends of said cylinders, means discharging the material into said cylinders, stationary cam means disposed above said plungers for moving the latter downwardly to thereby discharge a predetermined quantity of material into said receptacles, a cap holder disposed above the other run of said conveyor, a cap ejector carried by each carrier for removing a cap from said holder for discharge of the cap into a receptacle, means at the other end of said conveyor for pressing a cap into a receptacle, a discharge platform extending downwardly from one end of said table, and means operable by one of said shafts removing said receptacles from said carriers and moving said receptacles onto said platform.

References Cited in the file of this patent

UNITED STATES PATENTS

| Number | Name | Date |
|---|---|---|
| 1,734,166 | Hansen | Nov. 5, 1929 |
| 2,078,040 | Taylor | Apr. 20, 1937 |
| 2,341,498 | Bell | Feb. 8, 1944 |

FOREIGN PATENTS

| Number | Country | Date |
|---|---|---|
| 419,239 | Great Britain | Nov. 8, 1934 |